(12) United States Patent
Kawamura

(10) Patent No.: US 9,720,309 B2
(45) Date of Patent: Aug. 1, 2017

(54) OPTICAL PROJECTION APPARATUS AND ILLUMINATION APPARATUS USING SAME

(71) Applicant: PANASONIC INTELLECTUAL PROPERTY MANAGEMENT CO., LTD., Osaka (JP)

(72) Inventor: Ryo Kawamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/852,383

(22) Filed: Sep. 11, 2015

(65) Prior Publication Data

US 2016/0081168 A1  Mar. 17, 2016

(30) Foreign Application Priority Data

Sep. 12, 2014 (JP) ................. 2014-185794

(51) Int. Cl.
*G03B 21/20* (2006.01)
*H05B 37/02* (2006.01)
*H05B 33/08* (2006.01)
*H05B 41/392* (2006.01)

(52) U.S. Cl.
CPC ....... *G03B 21/2006* (2013.01); *G03B 21/206* (2013.01); *G03B 21/2046* (2013.01); *G03B 21/2053* (2013.01); *H05B 37/0209* (2013.01); *H05B 33/0863* (2013.01); *H05B 41/3921* (2013.01)

(58) Field of Classification Search
CPC ........ G03B 21/00; G03B 21/14; G03B 21/20; H04N 5/74; H05B 37/02; G06F 3/00; F09G 5/08
See application file for complete search history.

(56) References Cited

U.S. PATENT DOCUMENTS

| 2007/0211469 A1* | 9/2007 | Hewlett | G02B 26/0833 362/283 |
|---|---|---|---|
| 2011/0285515 A1 | 11/2011 | Fushimi et al. | |

FOREIGN PATENT DOCUMENTS

| JP | 5319999 B2 | 10/2013 |
|---|---|---|
| JP | 5466995 B2 | 4/2014 |

* cited by examiner

*Primary Examiner* — Sultan Chowdhury
*Assistant Examiner* — Danell L Owens
(74) *Attorney, Agent, or Firm* — McDermott Will & Emery LLP

(57) ABSTRACT

An optical projection apparatus includes a light specification setting unit for setting a specification of a light, a shape setting unit for setting a shape made by the light, a position setting unit for setting a position of the shape, a size setting unit for setting a size of the shape, an optical data generation unit for generating optical data based on the specification, the shape, the position, and the size. The optical projection apparatus further includes a light drawing unit for generating light drawing data by performing a drawing process with the optical data, an optical projection unit for projecting the shape at the position with the light drawing data, and a manipulation unit for allowing a user to set one or more parameters indicating the specification, the shape, the position, and the size.

16 Claims, 15 Drawing Sheets

OPTICAL PROJECTION APPARATUS AND ILLUMINATION APPARATUS USING SAME

RELATED APPLICATION

This application claims the benefit of Japanese Application No. 2014-185794, filed on Sep. 12, 2014, the disclosure of which application is incorporated by reference herein.

TECHNICAL FIELD

The disclosure relates to an optical projection apparatus which is configured to irradiate a light and thereby project a shape onto an arbitrary space and/or an object placed in the arbitrary space, and an illumination apparatus using same.

BACKGROUND ART

In producing a product exhibition, a stage performance, or the like, there has been used illumination presentation which is based on a technique of irradiating light from an illumination apparatus such as a spotlight and thereby projecting a shape onto an arbitrary space and/or an object placed in the arbitrary space in order to attract the attention of customers or audience and strengthen the impression of the product or the performance.

As a system for performing such illumination presentation, there is an illumination system including an illumination device whose irradiation direction is allowed to be changed, a driving unit for changing the irradiation direction, and a remote controller for irradiating visible light (see, e.g., Japanese Unexamined Patent Application Publication No. 546699). In this illumination system, the irradiation direction of the illumination device can be set such that an optical axis of the illumination device is directed to a position which a user specifies by using the visible light from the remote controller.

Further, there is an illumination apparatus which allows a user to select, from a predetermined base shape group, one or more base shapes to be obtained by an illumination light, and also allows the user to set a position to which the selected base shapes of the illumination light is to be projected such that the selected base shapes cover a space and/or an object while checking their images captured by a camera and displayed by a display device (see, e.g., Japanese Unexamined Patent Application Publication No. 5319999).

However, in the above illumination system, the optical axis of the illumination device is changed by using the driving unit, which makes the entire system complicated and scaled up. Further, the above illumination system is somewhat limited in performing the illumination presentation, since it allows the user to change only the irradiation direction and does not allow the user to change a specification of a illumination light, a shape obtained by irradiating the illumination light, and/or a size of the shape.

Further, in the above illumination device, the user needs to monitor the camera-captured images through the display device when the user sets the position to which the selected base shapes are to be projected. The existence of the camera and the display device makes the entire the apparatus complicated and scaled up. Furthermore, the above illumination device does not provide a function for allowing the user to set the position of the selected base shapes while directly checking the space and/or the object with the naked eye. Accordingly, in some cases, it may be difficult for the user to check the actual result of the illumination presentation instantly and accurately. Furthermore, in cases where the user needs to grasp the actual space and/or the actual object three-dimensionally with the naked eye in order to produce a product exhibit or a stage performance, the above illumination device is also limited.

SUMMARY OF THE INVENTION

In view of the above, the disclosure provides an optical projection apparatus that allows, by using a simple configuration, a user to intuitively set parameters for illumination presentation while seeing them with the naked eye, and an illumination device using the same.

In accordance with one aspect of the present invention, there is provided an optical projection apparatus, including a light specification setting unit configured to set a specification of a light, a shape setting unit configured to set a shape which is made by the light irradiated in a space, a position setting unit configured to set a position of the shape, the position being within a predetermined projection range in the space, a size setting unit configured to set a size of the shape, an optical data generation unit configured to generate optical data based on the specification, the shape, the position, and the size, a light drawing unit configured to generate light drawing data by performing a drawing process with the optical data, an optical projection unit configured to project the shape at the position with the light drawing data, and a manipulation unit configured to allow a user to set one or more parameters indicating at least one of the specification, the shape, the position, and the size.

The apparatus in accordance with the disclosure allows the user to set parameters regarding the illumination light or a shape to be projected to a space and/or an object by manipulating the manipulation unit while checking with the naked eye actual dimension of the space and/or the object and visual effects caused by the projected shape. Therefore, it is possible to easily and intuitively set the parameters such as the specifications of the illumination light, the shape to be projected, the position and/or the size of the shape, and the like. Further, since a driving unit for moving an optical axis of an illumination device is not necessary, the parameters can be set with a simple configuration.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

First Embodiment

Figure 1:
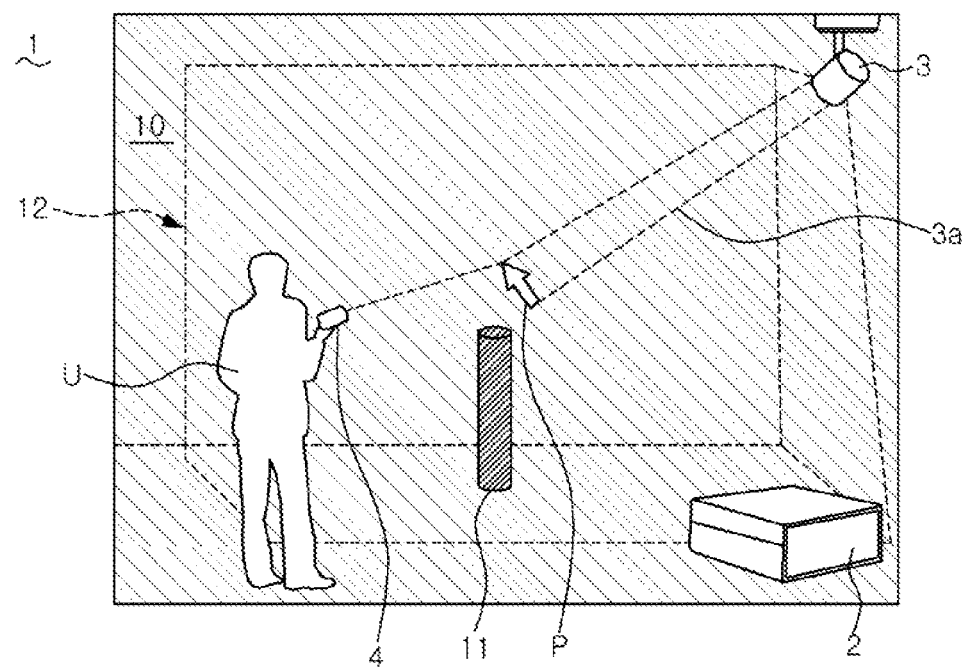
FIG. 1 is a perspective view showing a configuration of an optical projection apparatus in accordance with a first embodiment.

An optical projection apparatus according to a first embodiment will be described with reference to FIGS. 1 to 5 and 9. As shown in FIG. 1, an optical projection apparatus 1 in accordance with the present embodiment may be used as an illumination apparatus for irradiating a light to an arbitrary space 10 and/or an object 11 placed in the space 10.

The space 10 to which the optical projection apparatus 1 is applicable may be an indoor space or an outdoor space, which includes a show window, a stage in event facilities, and the like. Further, the object 11 to which the optical projection apparatus 1 is applicable may be in any one of a solid state, a liquid state, and a gaseous state. Further, the object 11 may be a living body.

Types of light that are obtainable from the optical projection apparatus 1 may include a type of light which is capable of projecting a shape to the space 10 and/or the object 11. This type of light may be referred to as "projection light 3a" hereinafter for the sake of convenience in explanation. However, the type of light that can be obtained by the optical projection apparatus 1 is not limited to the projection light 3a. Further, the projection light 3a may have one or more purposes, such as illumination and/or image display.

Figure 2:
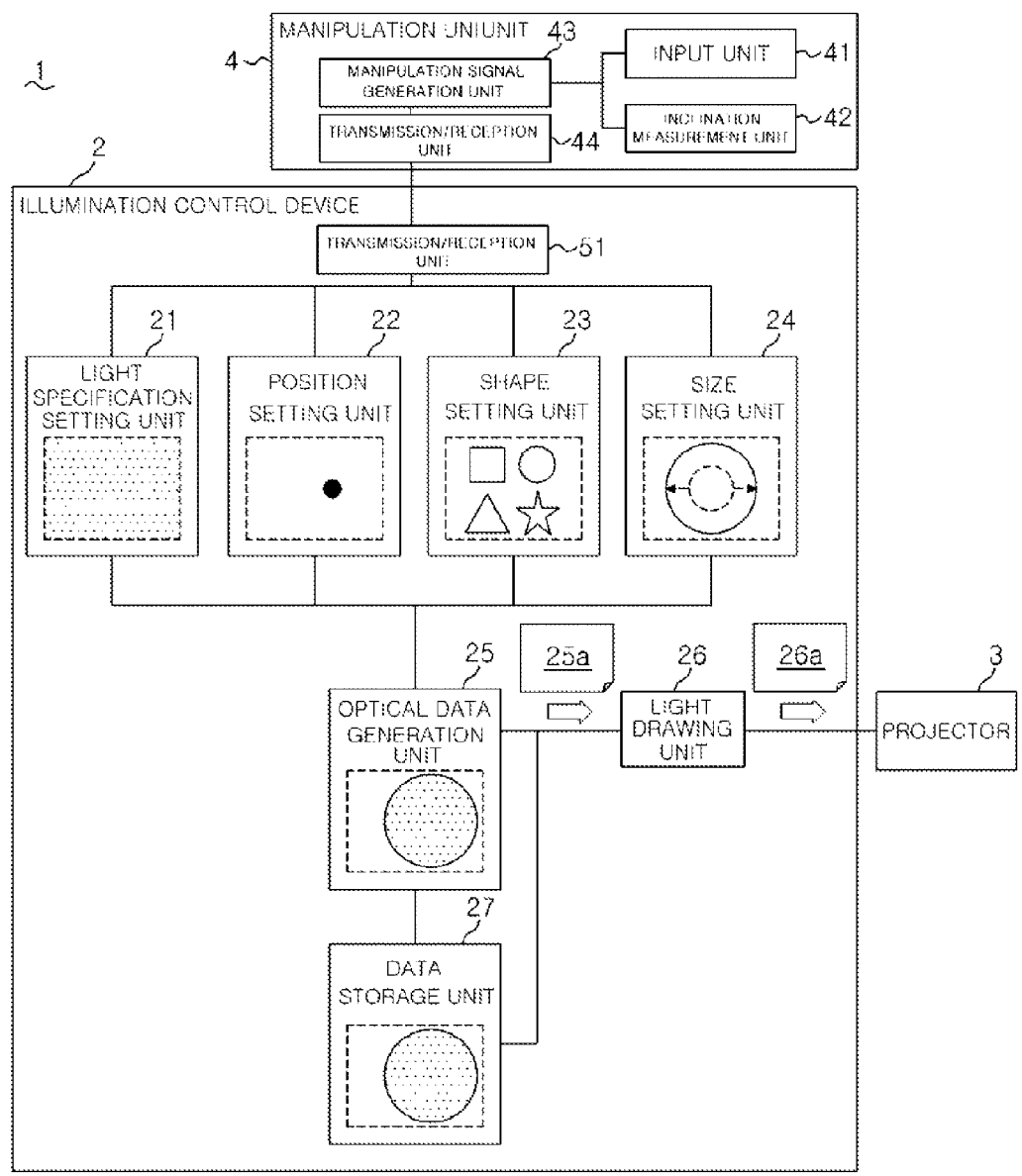
FIG. 2 is a block diagram of the optical projection apparatus in accordance with the first embodiment.

The optical projection apparatus 1 may include a control unit (for instance, an illumination control device 2), an optical projection unit (for instance, a projector 3), and a manipulation unit 4. The illumination control device 2 may be configured to set parameters for the operation of the optical projection apparatus 1, which may include parameters regarding the projection light 3a and/or a shape to be projected by irradiating the projection light 3a, and control the projector 3 based on the set parameters. For instance, the illumination control device 2 may be configured to generate a light drawing data 26a as shown in FIG. 2 based on one or more of the set parameters, and output the light drawing data 26a to the projector 3. Further, the illumination control device 2 may be configured such that a temporary shape, which is made according to user's manipulating the manipulation unit 4, is projected from the projector 3 onto the space 10.

The projector 3 may be configured to irradiate the projection light 3a to at least one of the space 10 and the object 11 under the control of the illumination control device 2. The projector 3 may be configured to receive the light drawing data 26a and project a shape by irradiating the projection light 3a based on the received light drawing data 26a.

The manipulation unit 4 may be configured to input information obtained by manipulation of the user U into the illumination control device 2. For instance, the manipulation unit 4 may be configured to generate a signal for setting the parameters based on the information and transmit the signal to the illumination control device 2.

In the embodiment shown in FIG. 1, the illumination control device 2 and the projector 3 are implemented as separate members. However, depending on embodiments, the projector 3 may include at least a part of the configuration of the illumination control device 2. The optical projection apparatus 1 may be configured such that the projection light 3a is irradiated from the projector 3 according to the user's manipulating the manipulation unit 4 and thereby a part of a predetermined projection range 12, which at least partially covers the space 10 and/or the object 11, is illuminated more brightly or darkly than the other part.

As shown in FIG. 2, the illumination control device 2 may include a light specification setting unit 21, a position setting unit 22, and a shape setting unit 23. The light specification setting unit 21 may be configured to set one or more specifications of a light such as the projection light 3a. The shape setting unit 23 may be configured to set a shape which is to be projected onto at least one of the space 10 and the object 11 by irradiating the projection light 3a. The shape may also be hereinafter referred to as 'light shape'. The position setting unit 22 may be configured to set a position of the shape within the projection range 12 in the space 10. The position of the shape may also be hereinafter referred to as 'light position'.

Further, the illumination control device 2 may further include a size setting unit 24 and an optical data generating unit 25. The size setting unit 24 may be configured to set a size of the shape which is set by the shape setting unit 22. The size of the shape may also be hereinafter referred to as 'light size'. The optical data generating unit 25 may be configured to generate an optical data 25a based on the contents set by any one of the light specification setting unit 21, the position setting unit 22, the shape setting unit 23, and/or the size setting unit 24. The contents may also be hereinafter referred to as 'characteristic information of projection light'.

The illumination control device 2 may further include a light drawing unit 26 for generating the light drawing data 26a by performing a drawing process with the optical data 25a generated by the optical data generating unit 25. As explained above, the projector 3 may be configured to irradiate the projection light 3a by using the light drawing data 26a generated by the light drawing unit 26.

At least a part of the configuration of the illumination control device 2 may be implemented by using a hardware (such as a dedicated logic circuit, a general-purpose processor, and/or a memory) or a software. The software may be stored in a storage medium.

Hereinafter, the configurations of the respective elements of the optical projection apparatus as stated above are explained in more detail.

The light specification setting unit 21 sets one or more specifications of the projection light 3a by user's manipulation. The specifications of the projection light 3a may include, e.g., a color, a brightness (such as a dimming rate) and/or a color temperature (which may be used to color mixing). However, the present disclosure is not limited thereto. The illumination light (e.g., the projection light 3a) in accordance with the present embodiment may have a general illumination light color such as incandescent color, warm white, white, neutral white, daylight color, and the like. However, the present disclosure is not limited thereto, and the primary light colors such as red, green, and blue or mixed colors thereof are also possible. Further, depending on embodiments, a plurality of projection lights may be overlapped by the projector 3. In that case, the light specification setting unit 21 may assign individual layers to the respective projection lights, and set a transparency of a color with respect to each layer.

The position setting unit 22 sets a position of the shape to be projected by the irradiation of the projection light 3a (e.g., central coordinates of the projection light 3a) in a range where the projection light 3a from the projector 3 can be irradiated (i.e., in the projection range 12) based on the specifications of the projection light 3a set by the light specification setting unit 21. The shape setting unit 23 sets a two-dimensional projection shape of the projection light 3a linked by the central coordinates. The size setting unit 24 sets a height and a width of the shape projected by the irradiation of the projection light 3a.

The optical data generation unit 25 generates an optical data 25a by integrating the characteristic information of the projection light 3a set by any one of the light specification setting unit 21, the position setting unit 22, the shape setting unit 23 and the size setting unit 24. The illumination control device 2 may further include a data storage unit 27 in which the optical data 25a is stored. The data storage unit 27 may be included in the optical data generation unit 25 or may be separately provided from the optical data generation unit 25 as shown in FIG. 2.

Details of the characteristic information may vary with a type of a light included in the projection light 3a. For example, when a light for illumination is included in the projection light 3a, the characteristic information may further include at least one of an illuminance, a brightness, a luminous intensity, a luminous flux, a color temperature, and a color rendering property. When a light for image display is included in the projection light 3a, the characteristic information may further include an image such as a moving image, a still image, and an image containing text and lines. The optical data generation unit 25 generates an optical data 25a specified by the characteristic information and outputs the generated optical data 25a to the light drawing unit 26. The light drawing data 26a generated by the drawing process in the light drawing unit 26 is also stored in the data storage unit 27. The optical data generation unit 25 and/or the light drawing unit 26 read out and reproduce the optical data 25a and/or the light drawing data 26a stored in the data storage unit 27 by manipulation of the user U. Since the optical data 25a and/or the light drawing data 26a which have been once set are reproduced, the user does not need to perform a new setting process as long as the optical projection apparatus is used under the same conditions, which enhances convenience.

The light drawing unit 26 generates the light drawing data 26a by performing the drawing process by using the optical data 25a outputted from the optical data generation unit 25. The light drawing data 26a is outputted from the illumination control device 2 to the projector 3 and the projection light 3a is irradiated from the projector 3. The illumination control device 2 may further include a transmission/reception unit 51 for transmitting/receiving a communication signal to and from the manipulation unit 4. The transmission/reception unit 51 performs bi-directional communication with the manipulation unit 4 by using wired or wireless communication.

As for the projector 3, it is possible to use a general-purpose a liquid crystal display (LCD) projector, a digital light processing (DLP) projector or the like. As for a light source of the projector 3, it is possible to use a metal halide lamp, LED, laser or the like. The illumination control device 2 and the projector 3 can communicate a control signal in a wired or a wireless manner, and include, e.g., a wiring connection terminal conforming to HDMI, an LAN system conforming to 100base-t, a wireless LAN conforming to IEEE 802.11 or the like.

The manipulation unit 4 may include: an input unit 41 having one or more manipulation buttons; an inclination measurement unit 42 for measuring an inclination of the manipulation unit 4; a manipulation signal generation unit 43 for generating a manipulation signal from the inclination measured by the inclination measurement unit 42 and/or the input from the manipulation button serving as the input unit 41; and a transmission/reception unit 44 for transmitting/receiving a manipulation signal to and from the illumination control apparatus 2. The inclination measurement unit 42 may include an attitude sensor, a general-purpose 3-axis acceleration sensor, or the like. The transmission/reception unit 44 may use a communication type corresponding to that of the transmission/reception unit 51 of the illumination control apparatus 2. As for the manipulation unit 4, a general-purpose presentation mouse may be used, for example.

By manipulating (e.g., touching) the manipulation unit 4, the user U can change at least one of the parameters set by the light specification setting unit 21, the position setting unit 22, the shape setting unit 23 and/or the size setting unit 24. Specifically, when the manipulation unit 4 is tilted in an arbitrary direction by the user U, the inclination measurement unit 42 measures the inclination of the manipulation unit 4 and outputs the measured inclination to the manipulation signal generation unit 43. The manipulation signal generation unit 43 generates a manipulation signal based on the measured inclination and outputs the generated manipulation signal to the transmission/reception unit 44. The transmission/reception unit 44 outputs the manipulation signal to the transmission/reception unit 51 of the illumination control apparatus 2. As a result, the manipulation signal is transmitted to the illumination control apparatus 2 and the mouse pointer P (see FIG. 1) can be moved within the projection range 12. If the user U presses the input unit (e.g., the manipulation buttons) in a state where the pointer P is moved to a predetermined position, the manipulation signal generation unit 43 generates a manipulation signal based on the input corresponding to the pressed manipulation button and outputs the generated manipulation signal to the transmission/reception unit 44. The transmission/reception unit 44 outputs the manipulation signal to the transmission/reception unit 51 of the illumination control apparatus 2. As a result, the manipulation signal is transmitted to the illumination control apparatus 2, which makes it possible to change the parameters set by the respective setting units 21 to 24.

Figure 3A:
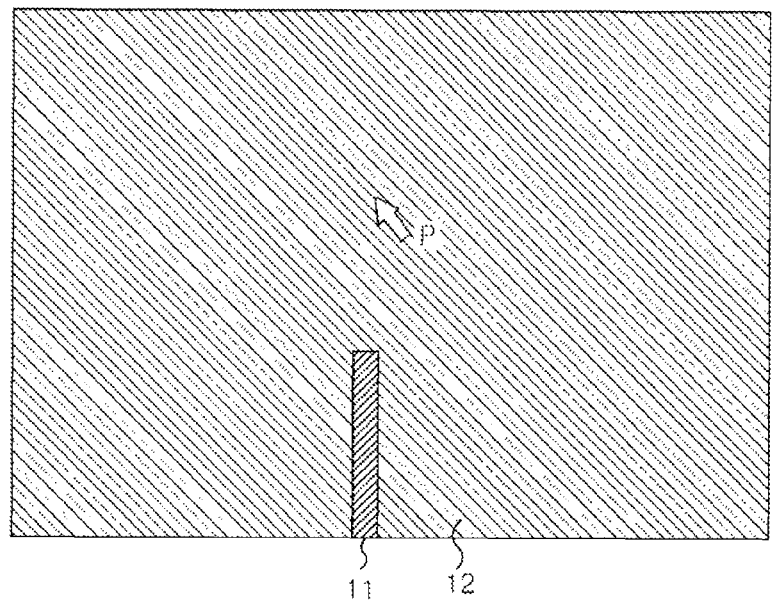
FIGS. 3A to 3F show an exemplary sequence of setting specification of a light, a shape to be projected, and a size of the shape in the optical projection apparatus.
Figure 3B:
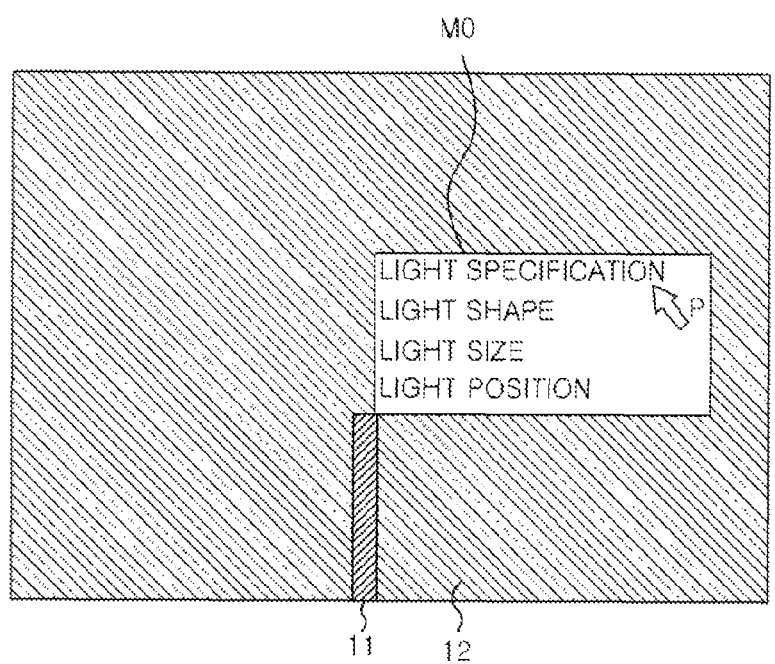

Hereinafter, an exemplary sequence of setting the parameters (e.g., the light specification, the light shape, and/or the light size) for illumination presentation in the optical projection apparatus 1 will be described with reference to FIGS. 3A to 3F. In the drawings, a pole-shaped object 11 and a background wall are illustrated as the projection range 12. When the user manipulates the manipulation unit 4, the optical projection apparatus 1 operates such that the pointer P is projected to the projection range 12 as shown in FIG. 3A. If the user presses the manipulation button of the input unit 41, the optical projection apparatus 1 operates such that a pop-up menu M0 shown in FIG. 3B is projected to the projection range 12. As illustrated, the optical projection apparatus displays, as the pop-up menu M0, 'LIGHT SPECIFICATION', 'LIGHT SHAPE', 'LIGHT POSITION', AND 'LIGHT SIZE'.

Figure 3C:
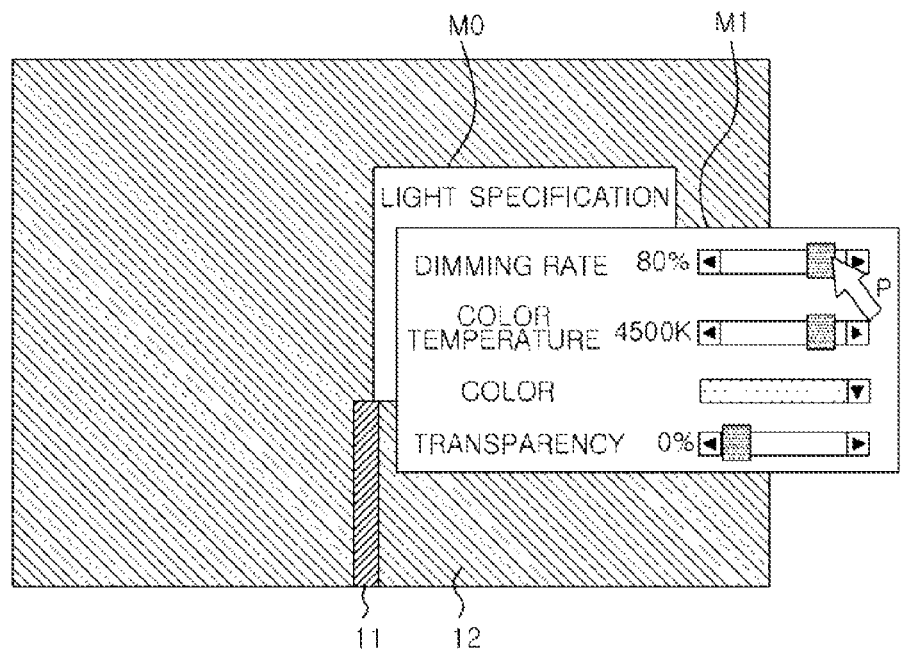

When the user selects 'LIGHT SPECIFICATION' by manipulating the pointer P, the optical projection apparatus 1 operates such that a menu M1 for setting a dimming rate parameter and a color temperature parameter is projected as shown in FIG. 3C. The optical projection apparatus 1 operates such that the parameters are expressed by numerical values of a dimming rate (%) and a color temperature (K) which can be consecutively changed by dragging a state bar displayed in the menu M1 by the pointer P or by clicking either of two icons which make a pair with each other and indicate 'increase' and 'decrease', respectively. Accordingly, the user can set the dimming rate (%) and the color temperature (K) of the projection light. The optical projection apparatus 1 may be configured to further display as the menu M1 for 'LIGHT SPECIFICATION' parameters for 'COLOR' and 'TRANSPARENCY' in addition to a general illumination light and allow the user to set them in the same manner (e.g., a setting sequence or the like) applied to the setting of the dimming rate and the color temperature.

Figure 3D:
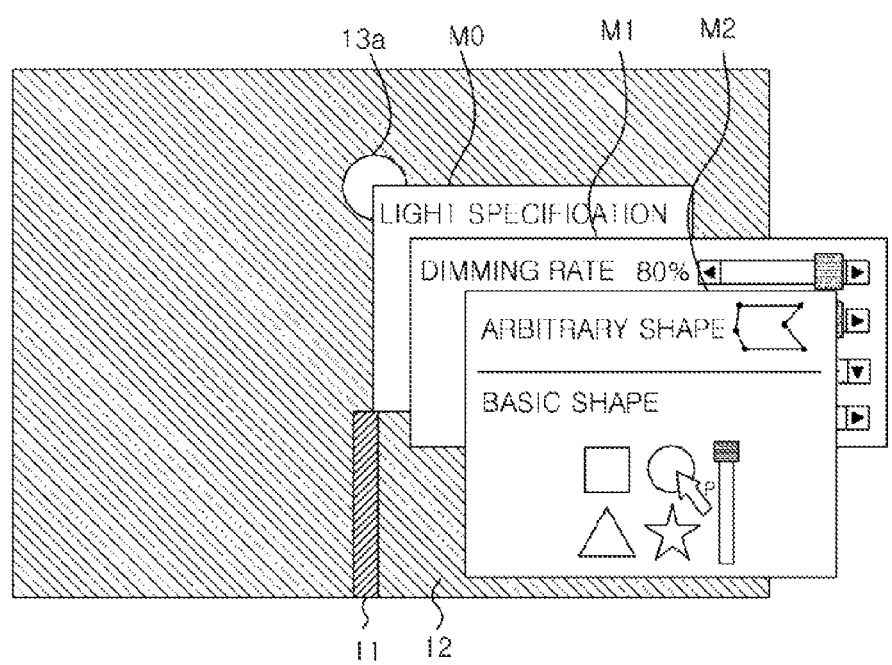
Figure 3E:
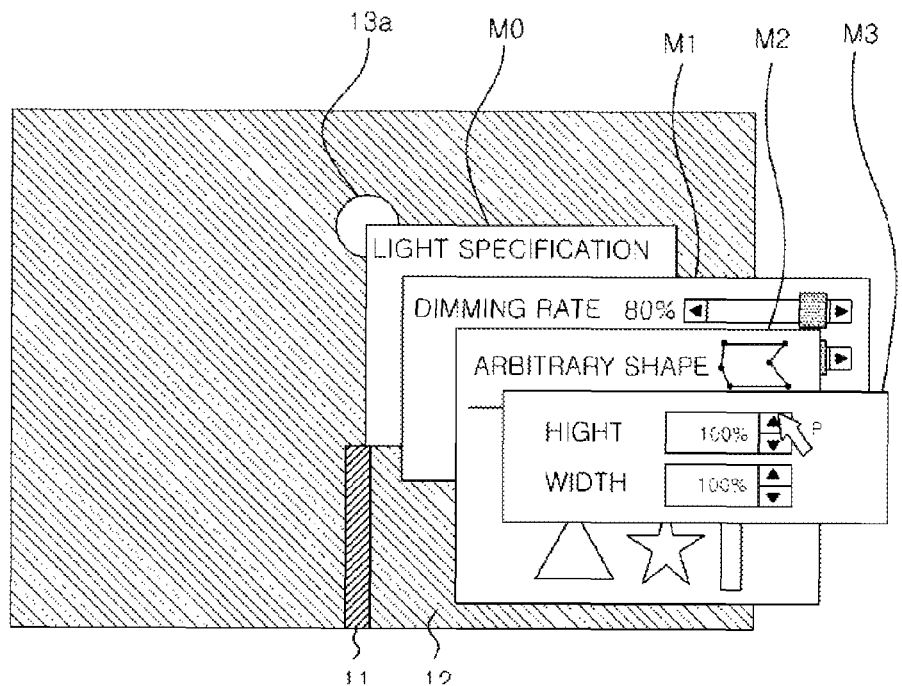
Figure 3F:
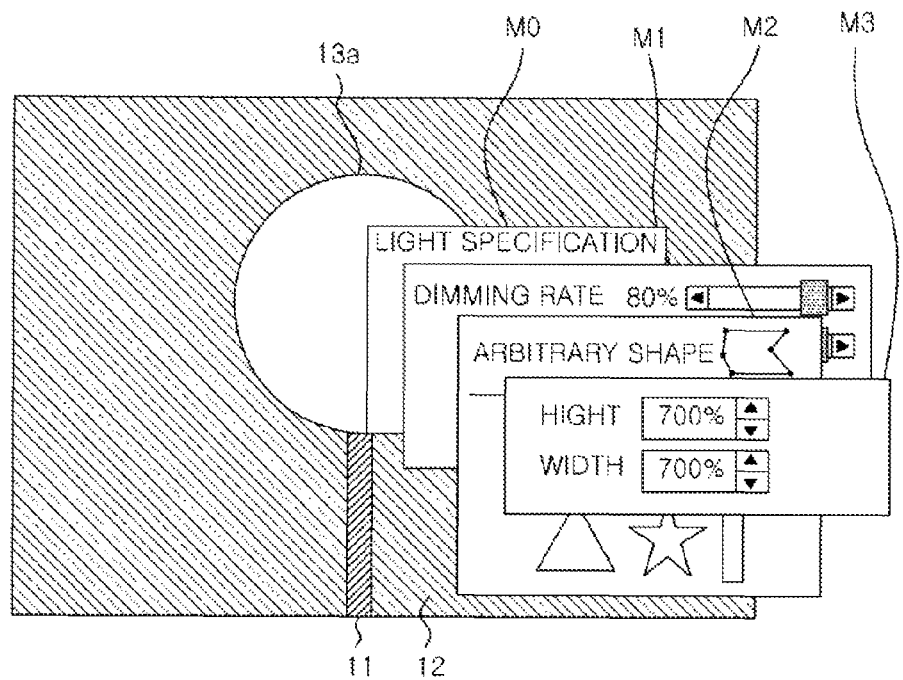

When the user selects 'LIGHT SHAPE' by manipulating the pointer P, the optical projection apparatus 1 operates such that a menu M2 for setting the light shape (i.e., a shape to be projected by light irradiation) is projected as shown in FIG. 3D. The optical projection apparatus 1 displays, as the menu M2 for setting 'LIGHT SHAPE', 'ARBITRARY SHAPE' that can be set by the user and 'BASIC SHAPE' including a plurality of shape patterns. If one of shape patterns (e.g., an icon '○' in the illustrated example) displayed in 'BASIC SHAPE' is selected, the optical projection apparatus 1 operates such that the selected shape pattern (i.e., the circular pattern) is projected as the output image 13a to the position of the pointer P shown in FIG. 3A When the user selects 'LIGHT SIZE' by manipulating the pointer P, the optical projection apparatus 1 projects a menu M3 for setting the light size (i.e., a size of the shape to be projected) as shown in FIG. 3E. The optical projection apparatus 1 displays, as the menu M3 for 'LIGHT SIZE', size parameters 'HEIGHT' and 'WIDTH' for specifying a height and a width of the selected shape pattern. The user can consecutively change the numerical values thereof by clicking either of two icons which make a pair with each other and indicate 'increase' and 'decrease', respectively. For example, if 'LIGHT SIZE' is set to a height of 700% and a width of 700%, the optical projection apparatus 1 enlarges the output image 13a of the circular pattern shown in FIG. 3E by seven times and projects the enlarged image as shown in FIG. 3F.

Figure 4A:
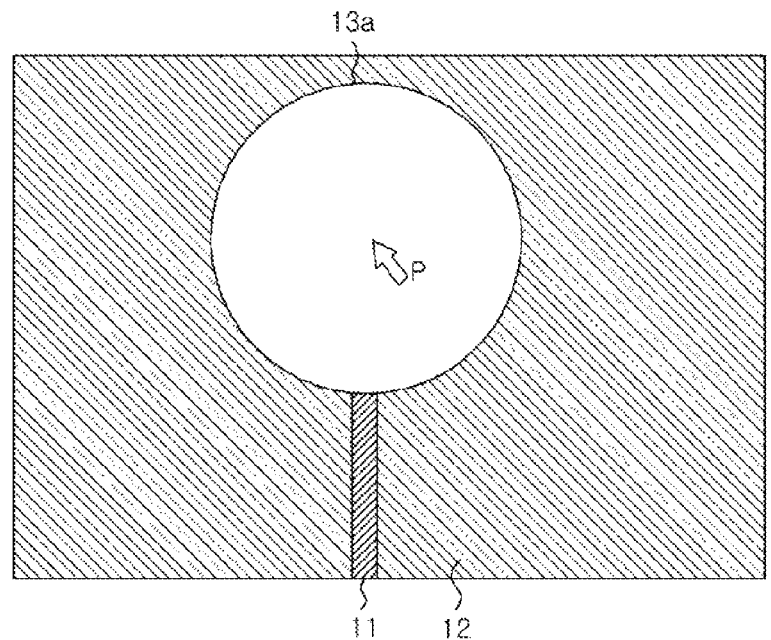
FIGS. 4A to 4D show an exemplary sequence of modifying the position of the shape in the optical projection apparatus.
Figure 4B:
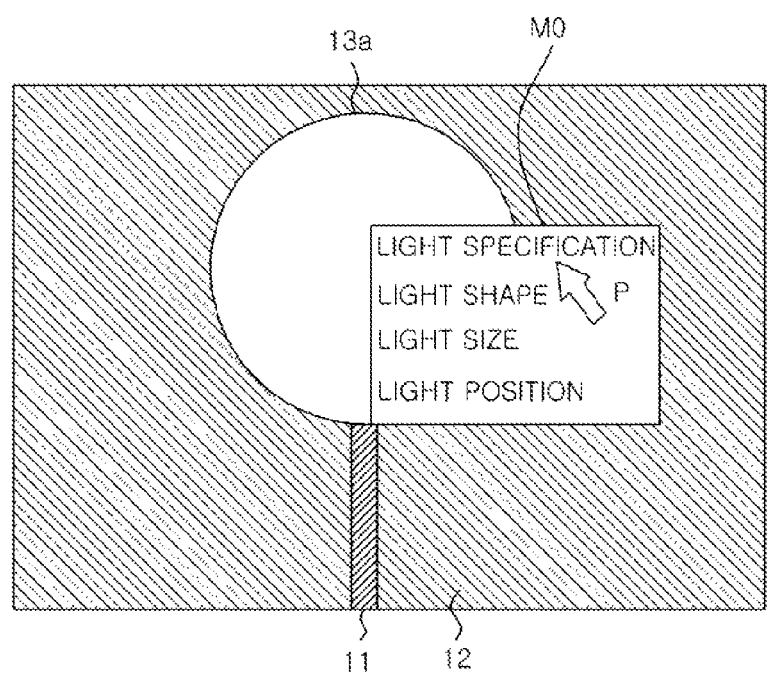
Figure 4C:
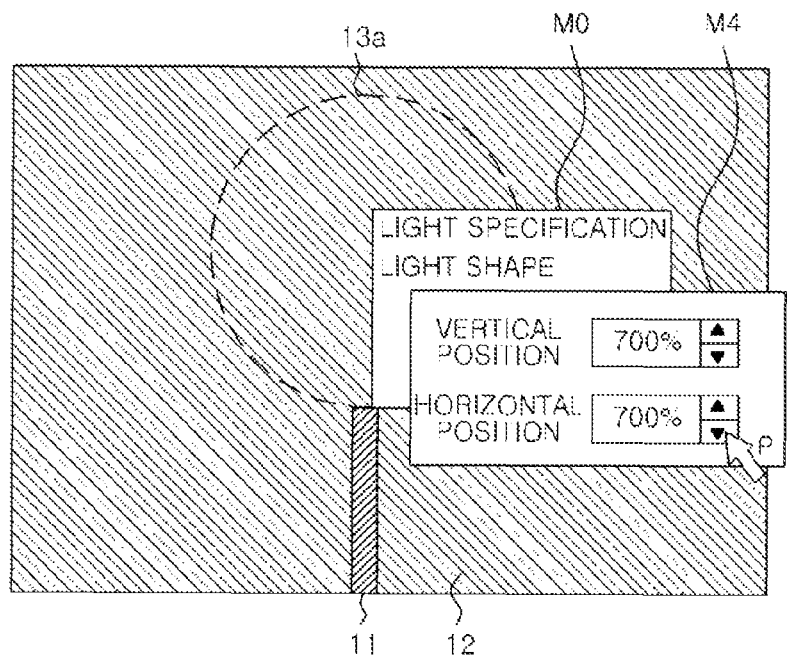
Figure 4D:
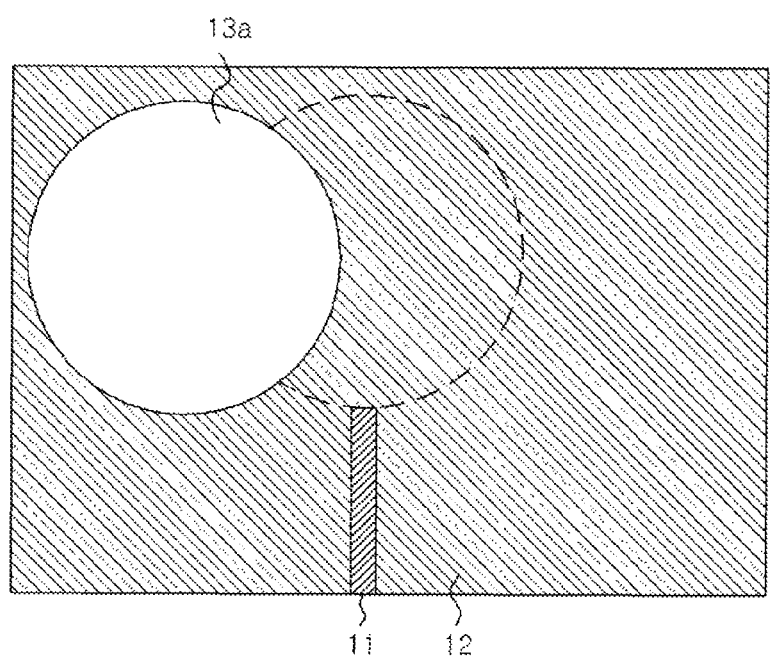

When the user clicks the output image 13a by pressing the manipulation button of the input unit 41 in a state where the pointer P is positioned on the output image 13a of the circular pattern as shown in FIG. 4A, the optical projection apparatus 1 operates such that the pop-up menu M0 shown in FIG. 4B is projected. Then, when the user selects 'LIGHT POSITION' in the pop-up menu M0 by manipulating the pointer P, the optical projection apparatus 1 operates such that light position parameters 'VERTICAL POSITION' and 'HORIZONTAL POSITION' and two pairs of up and down icons (i.e., icons indicating 'increase' and 'decrease', respectively) for consecutively changing the light position parameter are displayed in a menu M4 as shown in FIG. 4C. The optical projection apparatus 1 displays the position parameter as numerical values for specifying the vertical position and the horizontal position, for example. In the optical projection apparatus of this example, the coordinates defined based on the number of pixels (e.g., height of 1080, width of 1920) that can be outputted to the projection range 12 are used as the position parameter. However, the position parameter is not limited thereto as long as the position within the projection range can be specified by numerical values. When the position parameter is changed, the optical projection apparatus 1 displays the output image 13a that has been moved to the position corresponding to the changed position parameter as shown in FIG. 4D.

When an event (e.g., an event of completing execution of the pop-up menu M0 shown in FIG. 3B or clicking an icon (not shown) for generating the optical data 25a or the like) for generating the optical data 25a occurs by the manipulation of the manipulation unit 4 by the user U, the optical projection apparatus 1 operates such that the optical data 25a is generated based on the set parameters and the light drawing data 26a is generated if necessary.

In the above description, an example in which the user sets the specifications of the light, the shape of the light, the size of the light and the position of the light in that order has been described with reference to FIGS. 3A to 3F and 4A to 4D. However, this is merely an example for convenience of explanation and the setting sequence of the present embodiment is not limited thereto. For example, at least a part of the parameters may be set to a predetermined basic value before it is set by the user. In that case, a parameter that has not been set by the user can be set based on the basic value and the user can project the shape with reference to the basic value.

Figure 5:
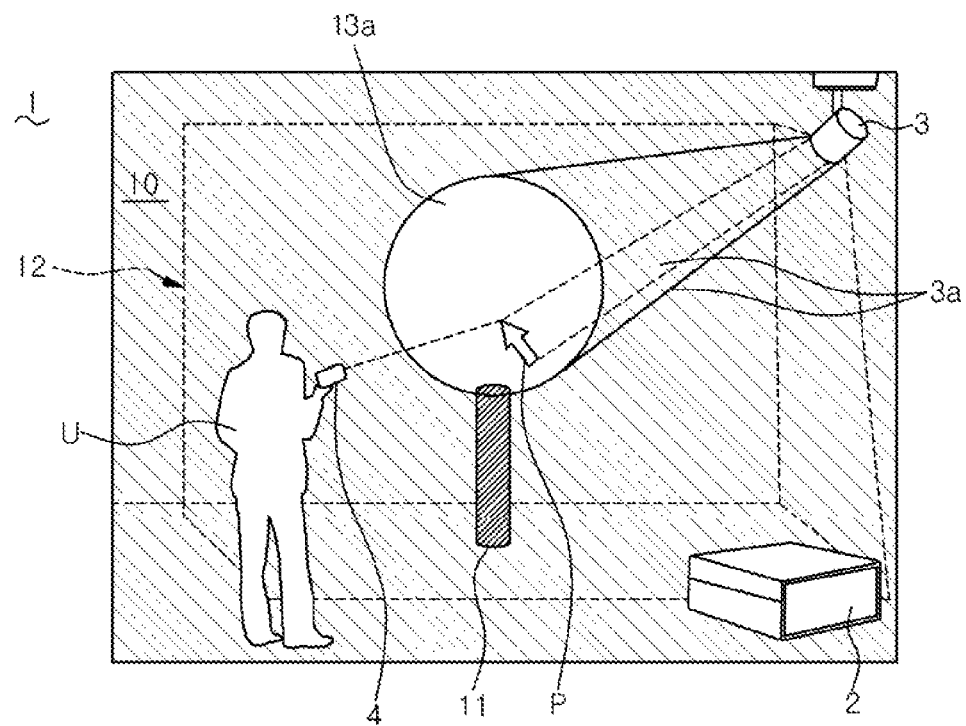
FIG. 5 is a perspective view which shows the optical projection apparatus projecting the shape.

As detailed above, the optical projection apparatus 1 in accordance with the present embodiment provides the following functions of setting various conditions by the menu projected to the projection range 12 to the user U: projecting the menu and the pointer P to the projection range 12; moving the pointer P projected to the projection range 12 or generating an event of clicking the icon on which the pointer P is positioned in response to the manipulation of the manipulation unit 4 by the user U (e.g., tilting the manipulation unit 4 in an arbitrary direction or pressing the manipulation button); and visualizing the result (e.g., the output image 13a) obtained by applying the parameters set by the user U by projecting the result to the projection range 12 in real-time before the optical data 25a is generated. Therefore, as shown in FIG. 5, the user U can set the shape of the output image 13a projected to the space and/or the object or the illumination light by manipulating the manipulation unit 4 while checking with naked eyes the actual size (e.g., area) of the space and/or the object or the impression caused by the illumination light instead of setting the projection range while monitoring images captured by the camera through the display device. Accordingly, it is possible to easily and intuitively set the parameters such as the specifications of the illumination light, the shape obtained by the illumination light, the position and/or the size of the light. Further, the optical projection apparatus 1 changes the illumination light within the projection range 12 of the optical projection unit (e.g., the projector 3), so that it is unnecessary to provide the driving unit for moving the optical axis of the illumination apparatus as long as the projection range 12 is maintained. Therefore, the parameters of the output image 13a can be set with a simple configuration. Even in the case of consecutively changing the parameters multiple times, the result of changes in the parameters can be instantly applied simply by changing the display on the projector 3 without operating the driving unit. As a result, the operation can proceed at a high response.

In the example shown in FIG. 5, there is set the illumination presentation in which a circular shape is projected to the pole-shaped object 11 as the output image 13a. In the case of performing the same illumination presentation by using a general spotlight, it is not easy to control the position or the size of the projected circular shape with high accuracy. On the other hand, in the optical projection apparatus 1 of the present embodiment, the user U can easily and intuitively set the position or the size of the projected circular shape by using the manipulation unit 4.

Figure 9:
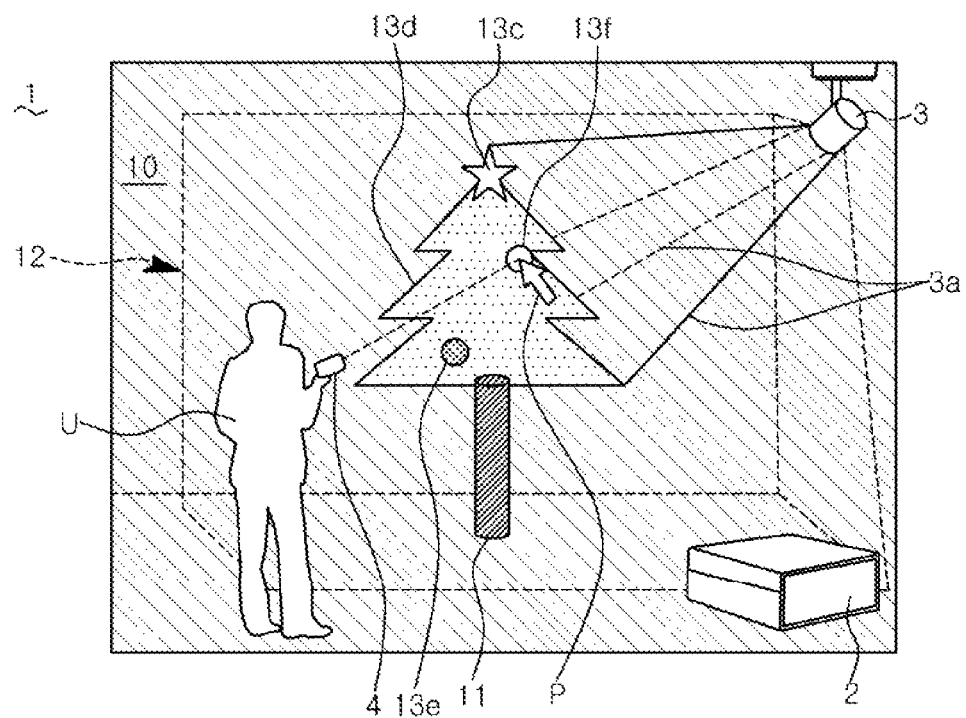
FIG. 9 is a perspective view which shows the optical projection apparatus projecting a plurality of shapes.

In the above-described embodiment, the optical data generation unit 25 can generates a plurality of optical data 25a simultaneously and the light drawing unit 26 can generate a plurality of light drawing data 26a simultaneously by performing the drawing process with the plurality of optical data 25a. The projector 3 (the optical projection unit) projects the shape with the plurality of light drawing data 26a. As shown in FIG. 9, for example, the projector 3 can perform various illumination presentations by projecting to the projection range 12 a plurality of output images 13c to 13f having different specifications, shapes, and sizes. The output images 13c to 13f can be grouped by dragging the projection range 12 where the output images 13c to 13f are projected with the pointer P, and various parameters thereof can be set or modified at one time.

Second Embodiment

Figure 6:
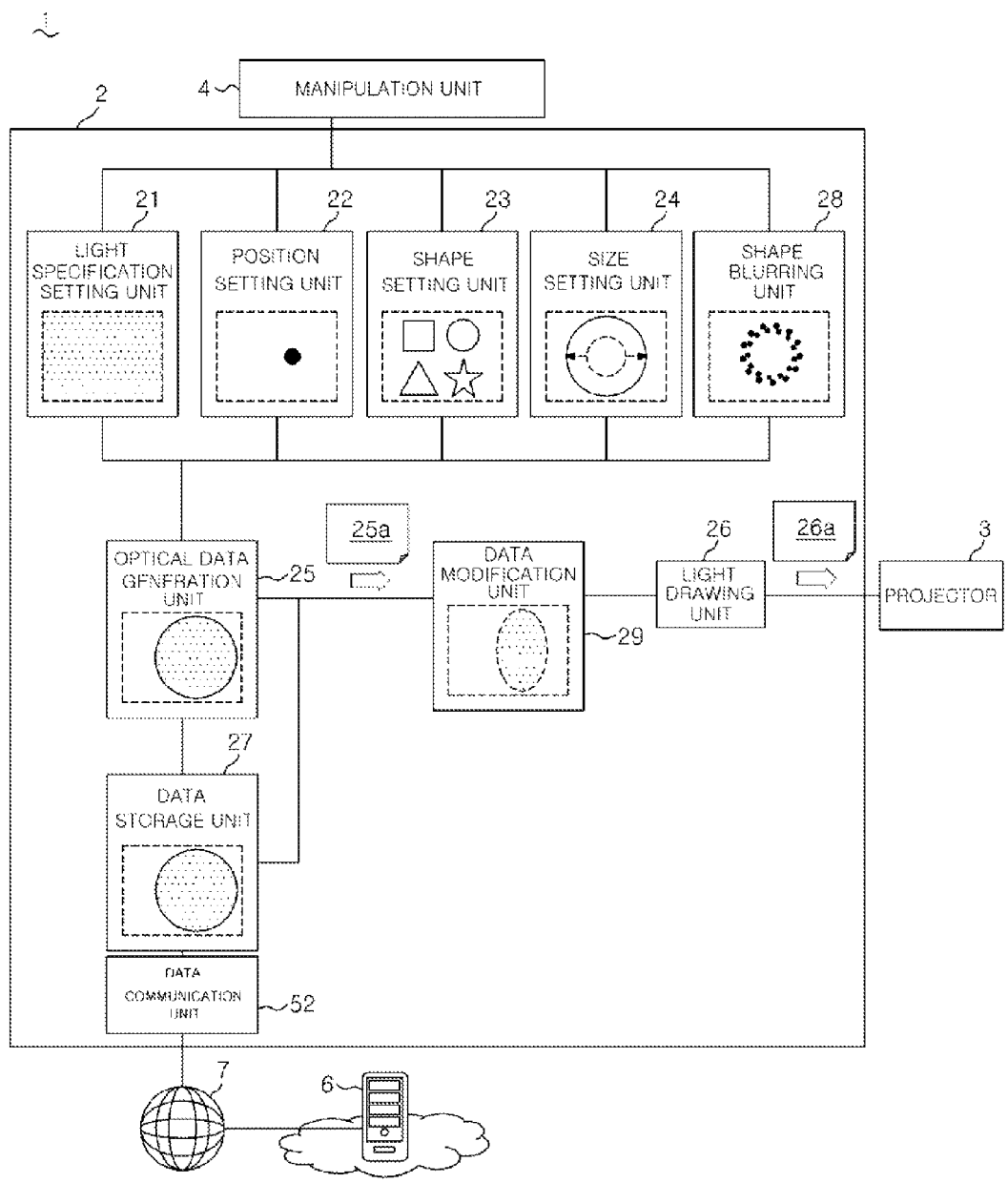
FIG. 6 is a block diagram of an optical projection apparatus in accordance with a second embodiment.

Hereinafter, an optical projection apparatus according to a second embodiment will be described with reference to FIGS. 6 to 8. The optical projection apparatus of the present embodiment includes substantially the same components as those of the optical projection apparatus of the first embodiment and further includes one or more additional components. Specifically, as shown in FIG. 6, the optical projection apparatus 1 of the present embodiment may further include, in addition to the components of the first embodiment, at least one of a shape blurring unit 28, a data modification unit 29 and a data communication unit 52. Although all of these components will be described in the following, the optical projection apparatus 1 may include at least one of these components.

The shape blurring unit 28 blurs a boundary of the shape set by the shape setting unit 23 with a preset width. The manipulation unit 4 allows the user to change the width of the boundary blurred by the shape blurring unit 28.

Figure 7A:
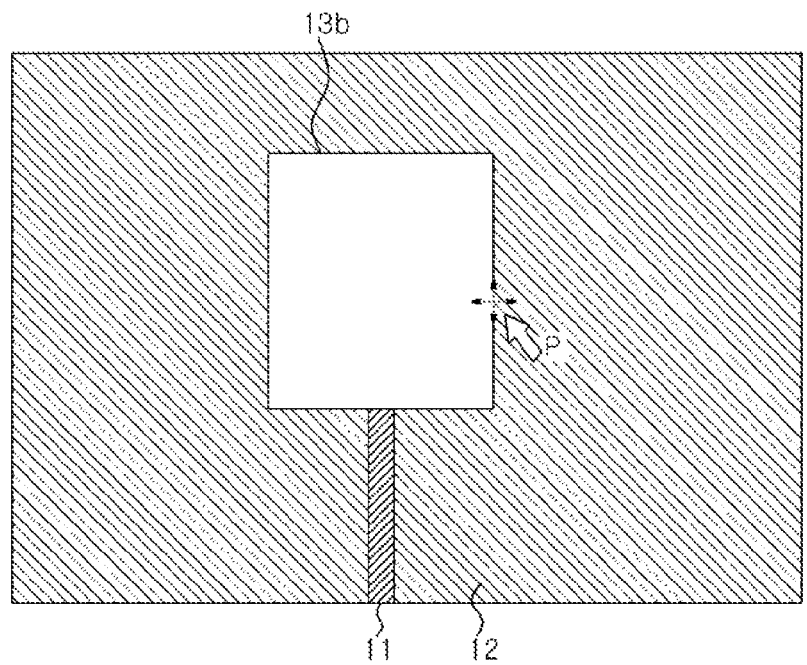
FIGS. 7A to 7E show an exemplary sequence of blurring the shape in the optical projection apparatus in accordance with a second embodiment.
Figure 7B:
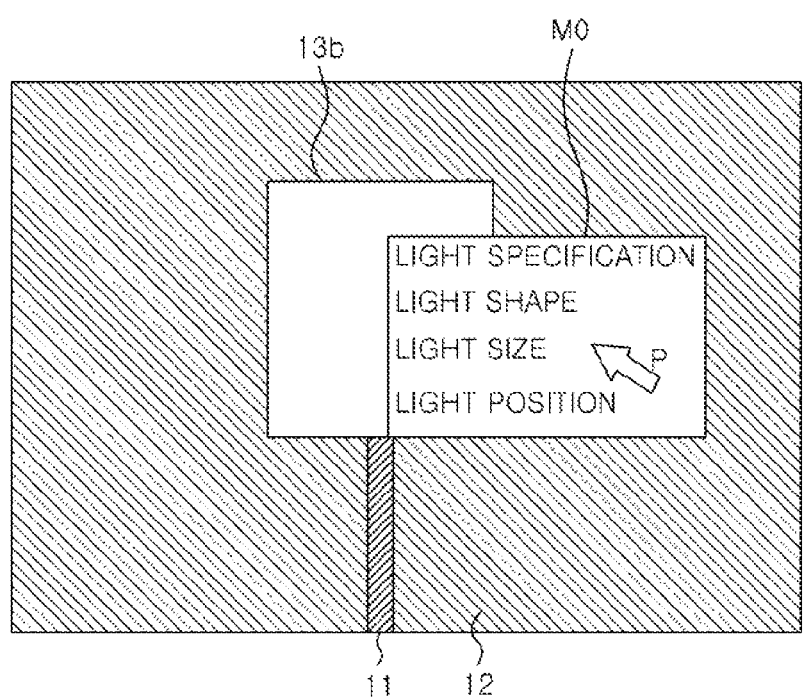
Figure 7C:
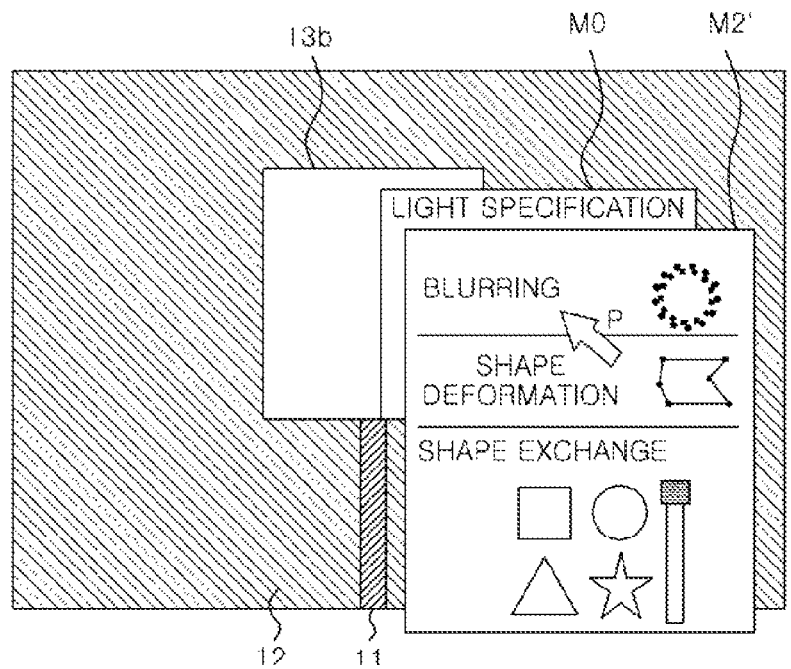

Hereinafter, an example of blurring the boundary of the light shape in the optical projection apparatus 1 by the shape blurring unit 28 will be described with reference to FIGS. 7A to 7E. As described in the sequence of the first embodiment 1, an output image 13b of a rectangular pattern is projected to the object 11 as shown in FIG. 7A. When the user U aligns the pointer P with the boundary of the shape of the output image 13b by manipulating the manipulation unit 4 and clicking the manipulation button of the input unit 41, the optical projection apparatus 1 operates such that the pop-up menu M0 shown in FIG. 7B is projected to the projection range 12. Then, when the user U selects 'LIGHT SHAPE', the optical projection apparatus 1 operates such that the menu M2' as shown in FIG. 7C for changing 'LIGHT SHAPE' is projected to the projection range 12. The menu M2' includes, e.g., 'BLURRING', 'SHAPE DEFORMATION' and 'SHAPE EXCHANGE'.

Figure 7D:
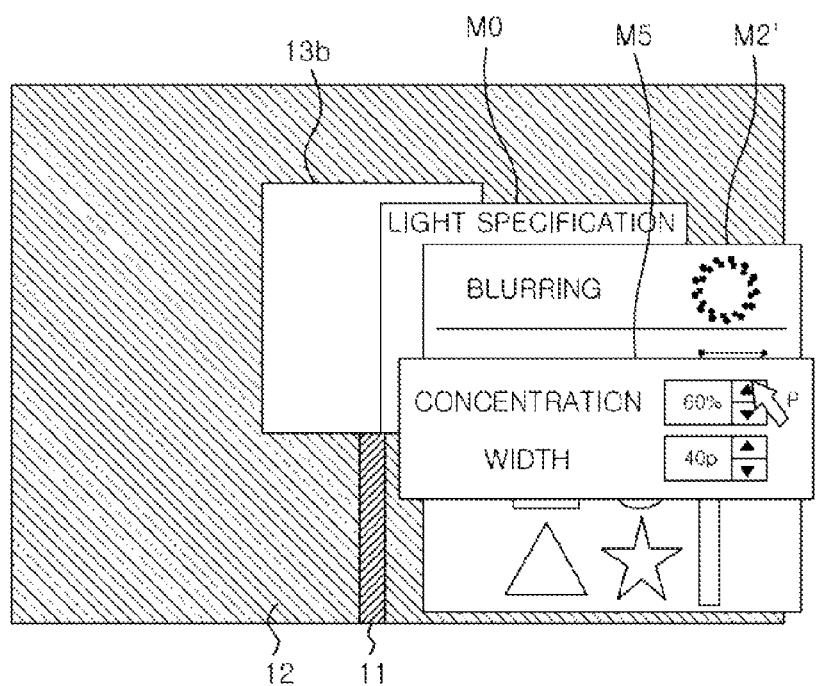
Figure 7E:
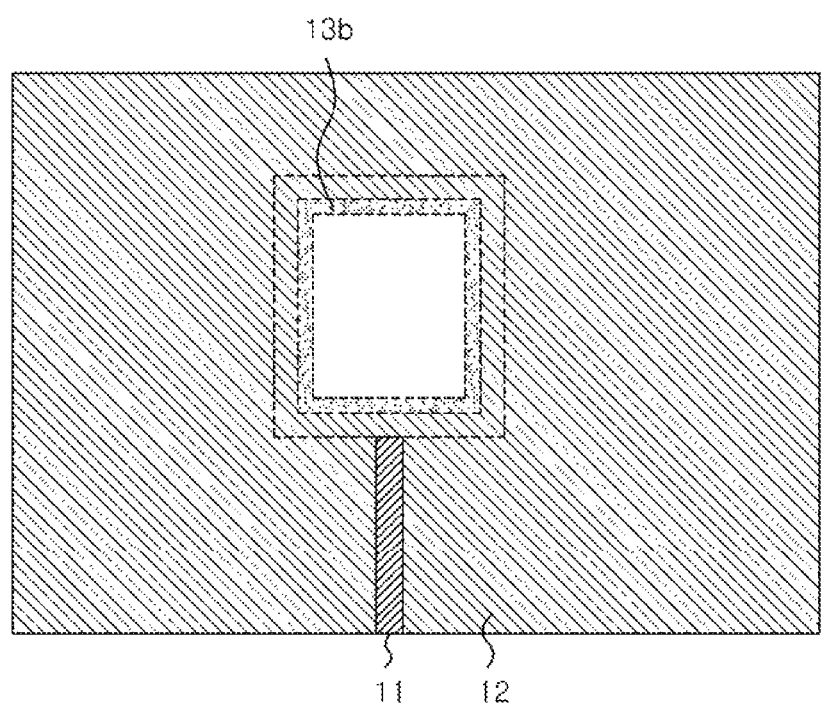

When 'BLURRING' is selected, the optical projection apparatus 1 operates such that there are displayed parameters 'CONCENTRATION' and 'WIDTH' for specifying numerical values of a blurring concentration and/or a blurring width at the boundary of the light shape and two pairs of up and down icons for consecutively changing the parameters in a menu M5 as shown in FIG. 7D. The user can blur the boundary of the output image 13b with an arbitrary concentration and an arbitrary width as shown in FIG. 7E in response to the control of the blurring parameters.

The data modification unit 29 can modify the contents of the optical data 25a generated by the optical data generation unit 25. The contents that can be modified by the data modification unit 29 may include a part or all of the above-described characteristic information (e.g., the specifications of the light, the shape of the light, the size of the light, the position of the light, the blurring width or the like).

Figure 8A:
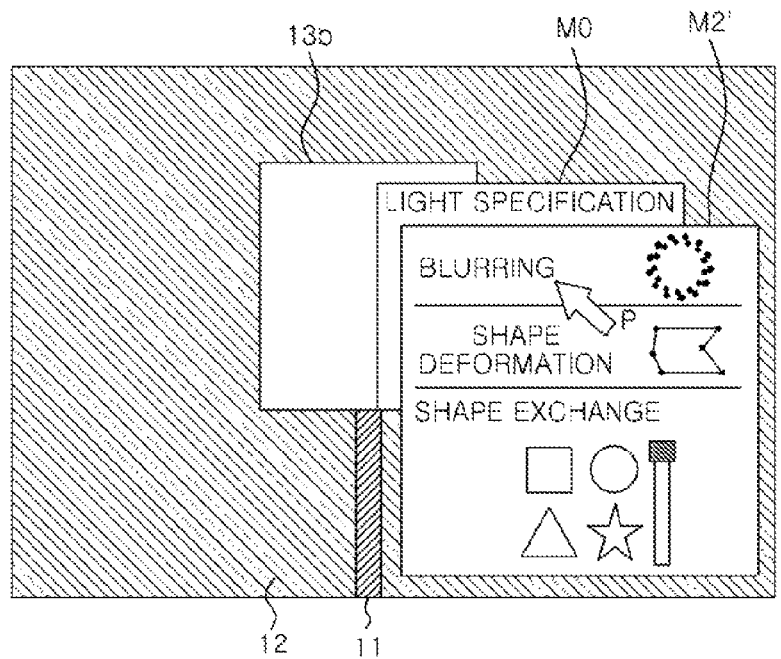
FIGS. 8A to 8D show an exemplary sequence of deforming the shape in the optical projection apparatus in accordance with a second embodiment.

Hereinafter, an example of modifying the light shape in the optical projection apparatus 1 by the data modification unit 29 will be described with reference to FIGS. 7A, 7B, and 8A to 8E. As shown in FIG. 7A, the output image 13b of the rectangular pattern is projected to the object 11. When the user U aligns the pointer P with the boundary of the shape of the output image 13B by manipulating the manipulation unit 4 and clicks the manipulation button of the input unit 41, the optical projection apparatus 1 projects the pop-up menu M0 shown in FIG. 7B to the projection range 12. Then, when the user U selects 'LIGHT SHAPE', the optical projection apparatus 1 projects the menu M2' for changing the light shape as shown in FIG. 8A. The optical projection apparatus 1 displays on the menu M2', e.g., 'BLURRING', 'SHAPE DEFORMATION' and 'SHAPE EXCHANGE'.

Figure 8B:
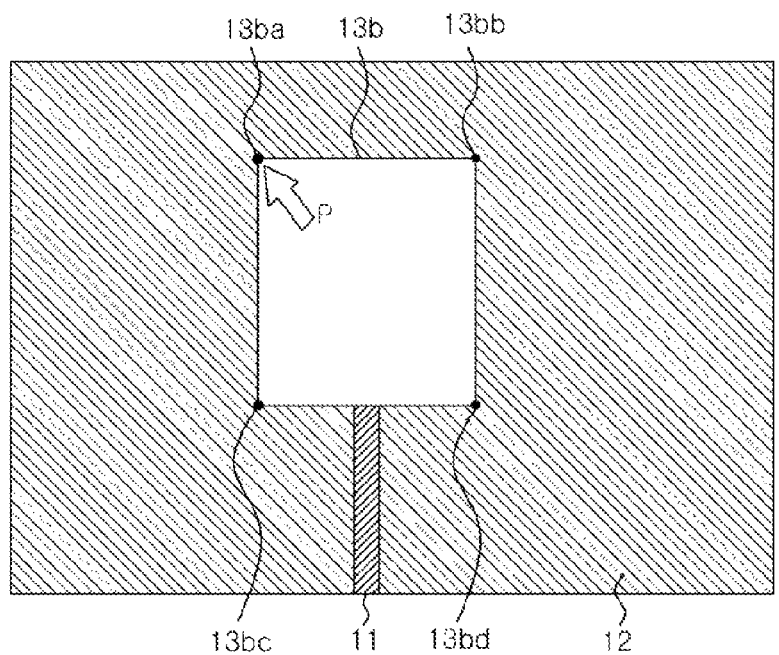
Figure 8C:
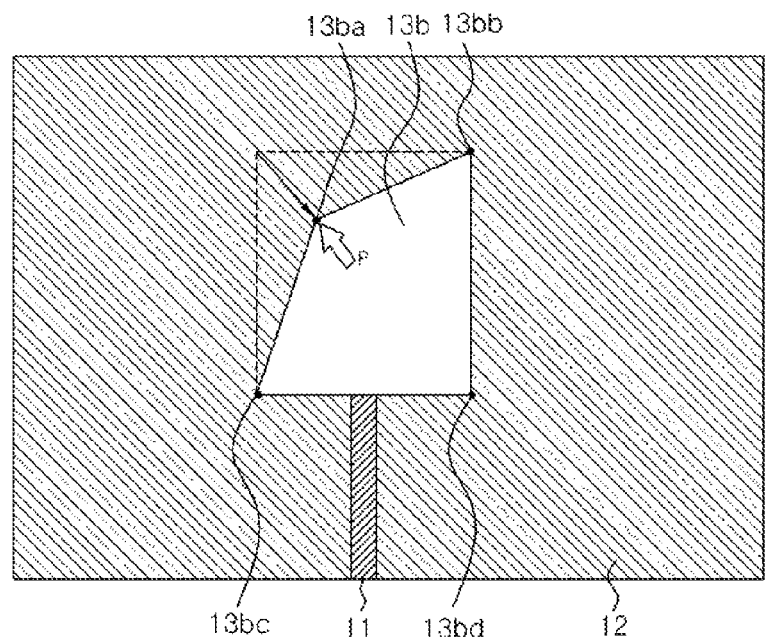
Figure 8D:
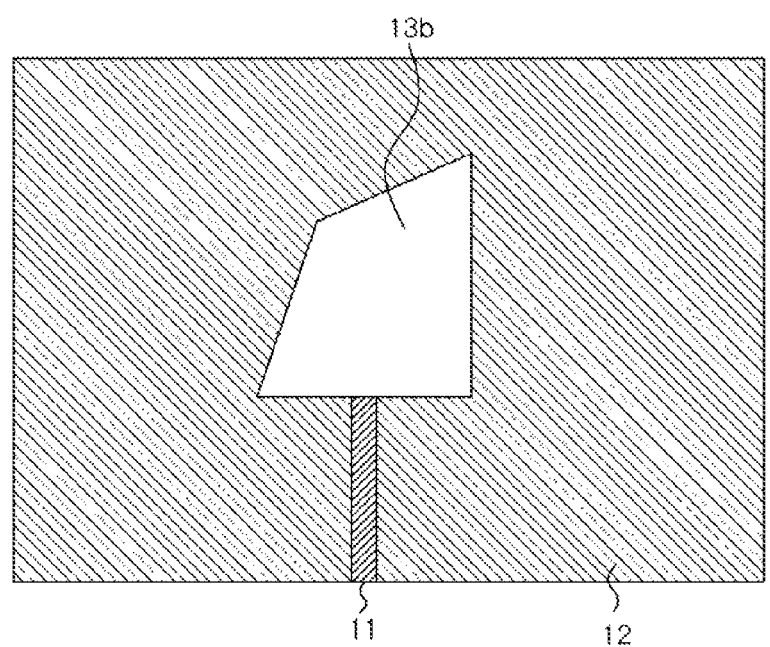

If 'SHAPE DEFORMATION' is selected as shown in FIG. 8A, the optical projection apparatus 1 projects emphasis points 13ba, 13bb, 13bc, 13bd that emphasize vertices of a quadrangle projected as the output image 13b to positions corresponding to the vertices as shown in FIG. 8B. When the user U aligns the pointer P with any one of the emphasis points 13ba, 13bb, 13bc, 13bd by manipulating the manipulation unit 4 and drags the pointer P to a desired position while pressing the manipulation button of the input unit 41, the emphasis point aligned with the pointer P is moved to the position of the dragged pointer P and a quadrangle obtained by connecting the moved emphasis point and the other points is projected to the projection range 12 as shown in FIG. 8C. Thereafter, the user U generates an event of completing the shape deformation (e.g., clicking a portion other than the emphasis points with the pointer P), the emphasis points disappear and the shape of the output image 13a is changed to the modified quadrangle as shown in FIG. 8D. In addition, the additional display for shape deformation is not limited to the emphasized point. The additional display for the shape deformation is not limited to the emphasis points. For example, when the shape is circular, there may be additionally displayed a dashed line or the like for guiding changes in a radius and/or a curvature radius by the drag of the pointer P.

The optical projection apparatus 1 according to the embodiment can provide a function of changing the set shape in detail and a function of exchanging the set shape with another shape among the predetermined shapes. Referring back to FIG. 8A, the menu M2' for 'SHAPE EXCHANGE' displays at least a part of the predetermined shapes, e.g., a triangle, a quadrangle, and a star. When the number of predetermined shapes is greater than the number of shapes that can be displayed on the menu M2' (e.g., four), a scroll bar is additionally displayed on the menu M2' so that various shapes can be displayed by vertically moving the scroll bar. When the user U aligns the pointer P with any one of the shapes displayed on the menu M2' by manipulating the manipulation unit 4 and clicks the shape, the shape of the output image 13a is exchanged with the clicked shape. The function as explained above may be performed by using the data modification unit 29.

As shown in FIG. 6, the optical projection apparatus 1 of the present embodiment may further include, in addition to the configuration of the first embodiment, an optical data 25a stored in the data storage unit 27 or a data communication unit 52 for communicating the light drawing data 26b. For example, the data communication unit 52 is connected to a server 6 on a cloud via a wireless Internet and/or an Internet line 7, so that the optical data 25a or the light drawing data 26b can be stored in the server 6. In addition, the optical data 25a or the light drawing data 26b created in a virtual space by using a personal computer connected to the server 6 may be stored in the server 6 and received, read out, and modified in a location where the optical projection apparatus 1 is installed. Moreover, an image optical data as the characteristic information can be downloaded from the server 6 to the optical projection apparatus 1 and projected to the projection range 12.

The disclosure may be variously modified without being limited to the above embodiments. For example, there may be provided a plurality of projectors 3. In that case, the lights having different specifications can be projected to, e.g., a side surface or a rear surface of the object 11, or a bottom surface or a rear surface of the background, which makes it possible to perform illumination presentation in which the object 11 itself seems to emit the light.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An optical projection apparatus, comprising:
   a light specification setting unit configured to set a specification of a light;
   a shape setting unit configured to set a shape which is made by the light irradiated in a space;
   a position setting unit configured to set a position of the shape, the position being within a predetermined projection range in the space;
   a size setting unit configured to set a size of the shape;
   an optical data generation unit configured to generate optical data based on the specification, the shape, the position, and the size;
   a light drawing unit configured to generate light drawing data by performing a drawing process with the optical data;
   an optical projection unit configured to project the shape at the position with the light drawing data; and
   a manipulation unit configured to allow a user to set one or more parameters indicating at least one of the specification, the shape, the position, and the size,
   wherein the optical projection unit is configured to project, to the predetermined projection range, a menu showing the parameters and a pointer moveable by the user.

2. The optical projection apparatus of claim 1, wherein the shape setting unit is configured to set the shape by using preset shape patterns, and
   wherein the manipulation unit is configured to allow the user to select one of the preset shape patterns.

3. The optical projection apparatus of claim 1, further comprising a shape blurring unit configured to blur a boundary of the shape with an arbitrary width,
   wherein the manipulation unit is configured to allow the user to set the arbitrary width.

4. The optical projection apparatus of claim 1, wherein the light specification setting unit is configured to perform brightness setting and color mixing by using a dimming rate parameter and a color temperature parameter, and
   wherein the manipulation unit is configured to allow the user to consecutively change at least one of the dimming rate parameter and the color temperature parameter.

5. The optical projection apparatus of claim 1, wherein the position setting unit is configured to set the position of the shape by using a vertical position parameter and a horizontal position parameter, and
   wherein the manipulation unit is configured to allow the user to consecutively change at least one of the vertical position parameter and the horizontal position parameter.

6. The optical projection apparatus of claim 1, wherein the size setting unit is configured to set the size of the shape by using a size parameter, and
   wherein the manipulation unit is configured to allow the user to consecutively change the size parameter.

7. The optical projection apparatus of claim 1, wherein the optical data generation unit is configured to generate multiple sets of optical data,
   wherein the light drawing unit is configured to generate multiple sets of light drawing data by performing drawing processes with the multiple sets of optical data, and
   wherein the optical projection unit is configured to simultaneously project a plurality of shapes with the multiple sets of light drawing data.

8. The optical projection apparatus of claim 3, further comprising a data modification unit configured to modify at least one of the specification, the shape, the position, the size, and the arbitrary width.

9. The optical projection apparatus of claim 1, further comprising a data storage unit configured to store the optical data,
   wherein the optical data generation unit is configured to read the optical data from the data storage unit.

10. The optical projection apparatus of claim 1, further comprising a data communication unit for communicating at least one of the optical data and the light drawing data with a server.

11. The optical projection apparatus of claim 1, wherein the manipulation unit includes an attitude sensor configured to measure an inclination of the manipulation unit in a vertical and a horizontal directions of the manipulation unit, and
    wherein the manipulation unit is configured to generate, based on the inclination, a manipulation signal for manipulating a mouse pointer for setting the parameters, the mouse pointer being projected from the optical projection unit within the predetermined projection range.

12. The optical projection apparatus of claim 1, further comprising a data modification unit configured to modify at least one of the specification, the shape, the position, and the size.

13. The optical projection apparatus of claim 1, further comprising a data storage unit configured to store at least one of the optical data and the light drawing data,
    wherein the light drawing unit is configured to read at least one of the optical data and the light drawing data from the data storage unit.

14. An illumination apparatus, comprising:
    an optical projection apparatus,
    wherein the optical projection apparatus includes:
    a light specification setting unit configured to set a specification of a light;

a shape setting unit configured to set a shape which is made by the light irradiated in a space;

a position setting unit configured to set a position of the shape, the position being within a predetermined projection range in the space;

a size setting unit configured to set a size of the shape;

an optical data generation unit configured to generate optical data based on the specification, the shape, the position, and the size;

a light drawing unit configured to generate light drawing data by performing a drawing process with the optical data;

an optical projection unit configured to project the shape at the position with the light drawing data; and a manipulation unit configured to allow a user to set one or more parameters indicating at least one of the specification, the shape, the position, and the size, and wherein the optical projection unit is configured to project, to the predetermined projection range, a menu showing the parameters and a pointer moveable by the user.

15. The optical projection apparatus of claim 1, wherein the optical projection apparatus is configured to visualize a result obtained by applying the parameters set by the user to the predetermined projection range in real-time.

16. The illumination apparatus of claim 14, wherein the optical projection apparatus is configured to visualize a result obtained by applying the parameters set by the user to the predetermined projection range in real-time.

* * * * *